(12) United States Patent
Muto et al.

(10) Patent No.: US 11,376,673 B2
(45) Date of Patent: Jul. 5, 2022

(54) DEBURRING TOOL AND DEBURRING METHOD

(71) Applicant: SUGINO MACHINE LIMITED, Uozu (JP)

(72) Inventors: Mitsuru Muto, Uozu (JP); Masato Tozuka, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 51 days.

(21) Appl. No.: 17/060,559

(22) Filed: Oct. 1, 2020

(65) Prior Publication Data

US 2021/0107071 A1  Apr. 15, 2021

(30) Foreign Application Priority Data

Oct. 11, 2019 (JP) .............................. JP2019-187823
Aug. 31, 2020 (JP) .............................. JP2020-146086

(51) Int. Cl.
*B23B 51/10* (2006.01)
*B23B 31/08* (2006.01)
*B23B 31/107* (2006.01)
*B24B 27/033* (2006.01)
*B24B 29/00* (2006.01)

(52) U.S. Cl.
CPC .......... *B23B 51/102* (2013.01); *B23B 31/083* (2013.01); *B23B 31/08* (2013.01); *B23B 31/1071* (2013.01); *B23B 2220/08* (2013.01); *B24B 27/033* (2013.01); *B24B 29/005* (2013.01)

(58) Field of Classification Search
CPC ............... B23B 51/101; B23B 51/102; B23B 51/103; B23B 51/105; B23B 2220/08; B23B 31/08; B23B 31/083; B23B 31/086; B23B 31/1071; B24B 9/00; B24B 29/005; B24B 27/033; B23C 3/12
See application file for complete search history.

(56) References Cited

U.S. PATENT DOCUMENTS

2020/0009665 A1* 1/2020 Shimada .............. B23Q 9/0028

FOREIGN PATENT DOCUMENTS

DE   102011122040 A1 *  6/2013  ........... B23B 31/083
JP   2014140932 A  *  8/2014  ........... B23B 31/086
JP   6025580 B2    11/2016

OTHER PUBLICATIONS

Machine Translation, JP2014-140932A. (Year: 2014).*

* cited by examiner

*Primary Examiner* — Chwen-Wei Su
(74) *Attorney, Agent, or Firm* — United IP Counselors, LLC

(57) ABSTRACT

A deburring tool includes: a case; a hollow sleeve that reciprocates inside the cylinder in a non-rotating manner; a drive gear disposed inside the sleeve, includes a first tooth, and rotates together with the case and the sleeve; a reciprocating shaft disposed inside the sleeve, including a driven gear disposed at a basal end portion of the sleeve and a basal end side of the drive gear, the driven gear including a second tooth, a tool holder disposed at a distal end portion of the sleeve, and slides inside the sleeve in a rotational and reciprocating direction, and a stem that fixes the driven gear and the tool holder, and penetrates the drive gear, a first spring that urges the sleeve toward distal end direction; and a second spring that urges the tool holder from the drive gear toward distal end direction.

18 Claims, 5 Drawing Sheets

DEBURRING TOOL AND DEBURRING METHOD

CROSS-REFERENCE TO RELATED APPLICATIONS

This application claims the benefit of priority to Japanese Patent Application No. 2019-187823, filed on Oct. 11, 2019, and Japanese Patent Application No. 2020-146086, filed on Aug. 31, 2020, the entire contents of which are hereby incorporated by reference.

BACKGROUND

1. Technical Field

The present invention relates to a deburring tool and a deburring method.

2. Description of the Background

A conventional deburring tool includes a shank, and a stem movable in the axial direction with respect to the shank, and a cutting tool holding unit for holding a cutting tool, a tool guide unit for guiding the cutting tool holding unit in the axial direction with respect to the stem, and a spring for pressing the cutting tool holding unit against a workpiece with respect to the stem, and an initial length adjustment unit for adjusting the initial length of the spring. The conventional deburring tool is mounted on a spindle device of the machining tool (For example, Japanese Patent No. 6025580, hereinafter, Patent Literature 1).

BRIEF SUMMARY

The deburring tool of Patent Literature 1 sometimes excessively shaves the workpiece or insufficiently shaves the workpiece depending on the shape and position of the workpiece.

An object of the present invention is to provide a deburring tool and a deburring method capable of performing a uniform deburring process.

A first aspect of the present invention provides a deburring tool, including:
  a case including a shank and a cylinder;
  a hollow sleeve configured to reciprocate inside the cylinder in a non-rotating manner;
  a drive gear disposed inside the sleeve, the drive gear including a saw blade shaped first tooth at a basal end portion, the drive gear configured to rotate together with the case and the sleeve;
  a reciprocating shaft to which a tip tool is mountable, the reciprocating shaft disposed inside the sleeve, the reciprocating shaft including
    a driven gear disposed at a basal end portion of the sleeve and a basal end side of the drive gear, the driven gear including a second tooth at a distal end, the second tooth meshing with the first tooth,
    a tool holder disposed at a distal end portion of the sleeve, the tool holder configured to slide inside the sleeve in a rotational direction and in a reciprocating direction, and
    a stem configured to fix the driven gear and the tool holder, the stem penetrating the drive gear,
  a first spring configured to urge the sleeve toward distal end direction; and
  a second spring configured to urge the tool holder from the drive gear toward distal end direction.

A second aspect of the present invention provides a deburring method, including:
  rotating a case, a sleeve and a drive gear together with a spindle of a machining tool;
  transmitting rotating torque from the drive gear to a driven gear to rotate a tip tool together with a reciprocating shaft;
  receiving reactive torque to the tip tool in a reverse direction of a rotational direction of the case by a workpiece contact with the tip tool so that the reciprocating shaft rotates in a reverse direction of the rotational direction with respect to the sleeve;
  moving the reciprocating shaft to a basal end direction against an elastic force of a second spring with the driven gear sliding with respect to the drive gear; and
  cutting the workpiece by the tip tool.

The tip tool is, for example, a so-called rotary bar or brush. The rotary bar is, for example, a cutting tool in which a large number of cutting edges are arranged on the surface of a rod-shaped or egg-shaped cemented carbide metal base material. The brush is, for example, a cylindrical brush, and is used for deburring the tip surface. The bristle material of the brush is, for example, ceramic, or metal.

The sleeve is hollow cylindrical. The outer surface of the sleeve slides on the inner surface of the cylinder. Preferably, the sleeve includes a stopper. The stopper restricts the movement of the reciprocating shaft toward the basal end. The axial moving length of the reciprocating shaft relative to the sleeve is the distance between the stopper and the driven gear.

The tool holder slides on the inner surface of the sleeve.

The drive gear includes a first tooth on the end face of the basal end side. The driven gear includes a second tooth on the end face of the distal end side. The first and second teeth mesh and transmit rotation of the first tooth to the second tooth. When the tip tool comes into contact with the workpiece and receives the cutting torque, the second tooth slides relative to the first tooth, and the driven gear moves toward the basal end. The first tooth has a first sliding surface which is inclined so as to be positioned on the distal end side as it advances in the rotational direction. Preferably, the intersection line between the first sliding surface and the cylindrical surface having a rotation axis at the center of the deburring tool draws a spiral. The second tooth has a second sliding surface which is inclined so as to be positioned on the distal end side as it advances in the rotational direction. The first sliding surface slides with the second sliding surface.

One or more of the first ball holding hole, the first ball, and the first roller groove may be disposed. The number of the first ball holding holes and the number of the first roller grooves are the same. The first ball is arranged between the first ball holding hole and the first roller groove. Preferably, a plurality of first ball holes, the first balls and the first roller grooves are evenly arranged on the circumference. Preferably, two to four first ball holding holes are arranged. More preferably, two first ball holes are arranged.

The first ball holding hole extends along the radial direction. The first ball holding hole may be a through hole. A hollow holding cylinder for holding the first ball may be disposed on the outer periphery of the first ball holding hole. The holding cylinder is fixed to the cylinder.

One or more of the second ball holding hole and the second ball may be disposed. Preferably, a plurality of the second ball holding holes are evenly arranged on the circumference. The second balls are respectively arranged in the second ball holding hole. For example, two to four second ball holding holes may be arranged. Preferably, three second ball holding holes and second balls are arranged.

The second ball holding hole may extend radially. The second ball may be held sandwiched between the inner surface of the inner cylinder and the second roller groove.

The second ball holding hole, the second roller groove, and the second ball may be omitted.

The drive gear may have a hemispherical third ball holding hole arranged on the outer peripheral surface of the drive gear. The sleeve may have a fourth ball holding hole of the same number as the third ball hole inside of the sleeve. A third ball is arranged between the third ball holding hole and the fourth ball holding hole. A plurality of the third ball holding holes and the fourth ball holding holes are arranged on the circumference. For example, two to four third ball holes are arranged. Preferably, three third ball holes are arranged. In this case, the drive gear is supported on the sleeve via the ball.

The third ball may be a pin for the purpose of supporting the drive gear with the sleeve. The pin extends radially. In this case, a third pin hole is provided instead of the third ball hole. A fourth pin hole is provided instead of the fourth ball hole. The third pin hole and the fourth pin hole are arranged through the sleeve, for example. The pin is implanted in the fourth pin hole and passes through the third pin hole.

The fourth ball holding hole may extend radially. The third ball may be held sandwiched between the fourth ball holding hole and the inner cylindrical surface of the cylinder.

The drive gear may be fixed inside the sleeve instead of being supported by the third ball holding hole, the fourth ball holding hole, and the fourth ball.

The driven gear reciprocates in the sleeve while rotating. The second tooth of the driven gear moves in the sleeve to the basal end direction while rotating in the reverse direction to the rotation direction of the tool with respect to the drive gear while rubbing with the first tooth of the drive gear.

The second balls, which are evenly arranged on the circumference, are supported by the cylinder to hold the tool holder at the center position of the cylinder.

The pushing force from the second spring to the reciprocating shaft acts as a frictional force between the sliding surface of the drive gear and the sliding surface of the driven gear, and torque is transmitted from the drive gear to the driven gear.

The sliding surface of the driven gear slides against the sliding surface of the drive gear by the elastic force of the second spring against the frictional force generated between the sliding surface of the drive gear and the sliding surface of the driven gear.

The deburring tool and the deburring method according to the present invention achieves uniform deburring.

DETAILED DESCRIPTION

Figure 1:
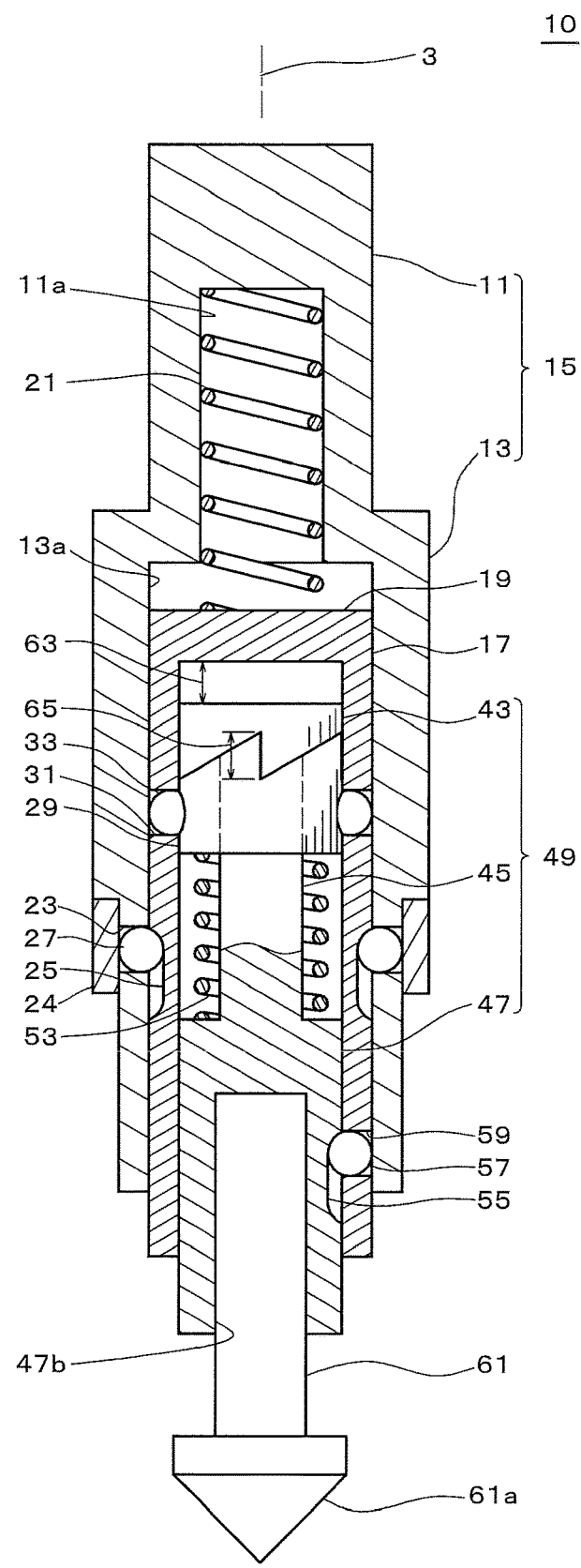
FIG. 1 is a longitudinal cross-sectional view of a tool according to an embodiment.

As shown in FIG. 1, a deburring tool 10 of the present embodiment includes a case 15, a sleeve 17, a first spring 21, a drive gear 29, a reciprocating shaft 49, and a second spring 53. The case 15 includes a shank 11 and a cylinder 13. The reciprocating shaft 49 includes a driven gear 43, a stem 45, and a tool holder 47 in the order from a basal end. The deburring tool 10 may include a stopper 19, a first ball holding hole 23, a first roller groove 25, a first ball 27, a ball holding cylinder 24, a third ball holding hole 35, a fourth ball holding hole 31, a third ball 33, a second ball holding hole 59, a second roller groove 55, and the second ball 57. The shank 11 is mounted, for example, on the spindle of a machining tool which is a machining center. The deburring tool 10 is used by rotating in the direction of the rotation direction 7 together with the spindle.

The shank 11 is a straight shank. The shank 11 is disposed at the basal end of the cylinder 13, and includes a spring housing hole 11a. The spring housing hole 11a is a right cylinder. The spring housing hole 11a is disposed inside the shank 11 along the center of the shank 11.

The cylinder 13 has an inner surface 13a. The inner surface 13a is a right cylinder. The inner surface 13a is disposed inside the cylinder 13 along the center of the cylinder 13, and connects to the spring housing hole 11a.

The sleeve 17 is a hollow cylindrical shape, and has an outer peripheral surface 17a and an inner surface 17b. The sleeve 17 reciprocates inside the cylinder 13 in the axial direction in a non-rotating manner. The outer peripheral surface 17a of the sleeve 17 slides on the inner surface 13a of the cylinder 13.

The stopper 19 is disposed at the basal end of the sleeve 17. The outer peripheral surface 17a of the sleeve 17 is guided to the inner surface 13a of the cylinder 13. The stopper 19 defines a moving length 63 of the driven gear 43 toward the basal direction.

The first spring 21 is, for example, a compression coil spring. The first spring 21 is disposed inside the spring housing hole 11a. The first spring 21 pushes the sleeve 17 toward the distal end direction.

The first ball holding hole 23 is located at the central portion of the inner surface 13a in the axial direction. For example, two first ball holding holes 23 are equally spaced on the circumference. The first ball holding hole 23 is a cylindrical hole extending in the radial direction. The first ball holding hole 23 penetrates the cylinder 13.

The first ball holding hole 23 may be, for example, hemispherical, or a cylindrical hole having a bottom. In this case, the ball holding cylinder 24 is omitted.

Figure 2:
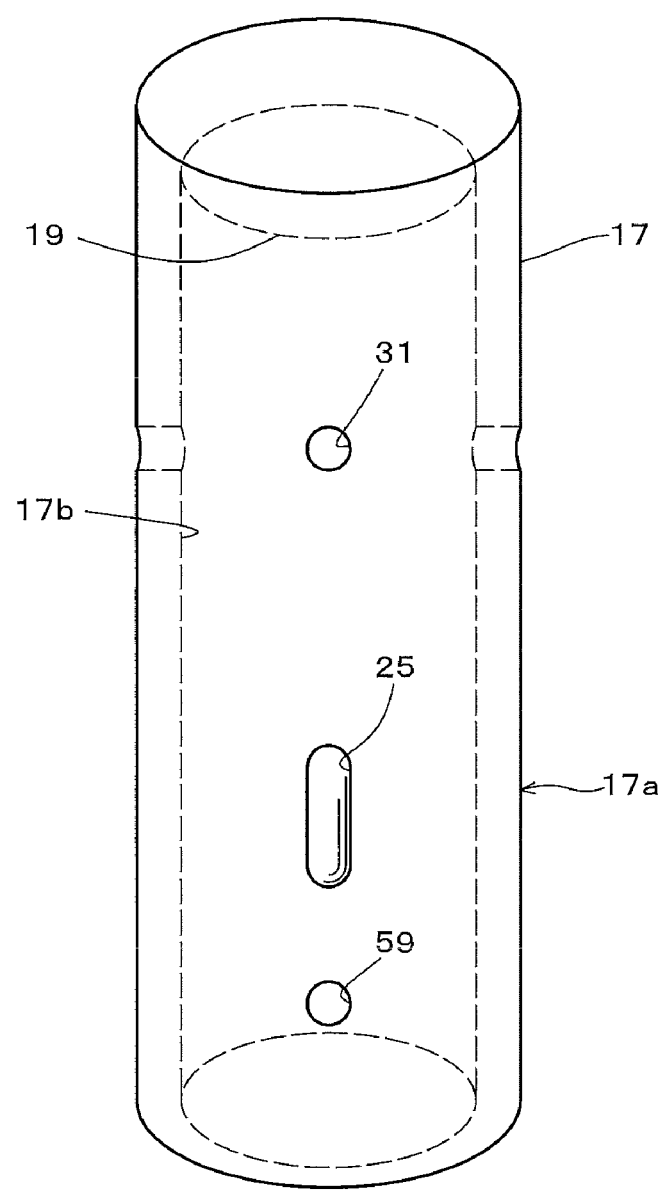
FIG. 2 is a perspective view of a sleeve according to the embodiment.

As shown in FIG. 2, the first roller groove 25 has a semicircular cross-section and extends in the axial direction. A plurality (e.g., two) of the first roller groove 25 is disposed in the circumferential direction on the outer peripheral surface 17a of the sleeve 17. The length of the first roller groove 25 determines the moving amount of the sleeve 17 in the axial direction with respect to the cylinder 13.

The first ball 27 is disposed between the first ball holding hole 23 and the first roller groove 25. The first ball 27 rolls in the first roller groove 25, and the sleeve 17 reciprocates in the axial direction. The first ball 27 is held in the first ball holding hole 23 by rolling in the first roller groove 25 to regulate the rotation of the sleeve 17.

The ball holding cylinder 24, which is a hollow cylinder, is disposed outside the first ball 27, and presses the first ball 27 radially inward. The ball holding cylinder 24 is fixed to the cylinder 13. The ball holding cylinder 24 restricts the first ball 27 to move outward in the radial direction.

Figure 3:
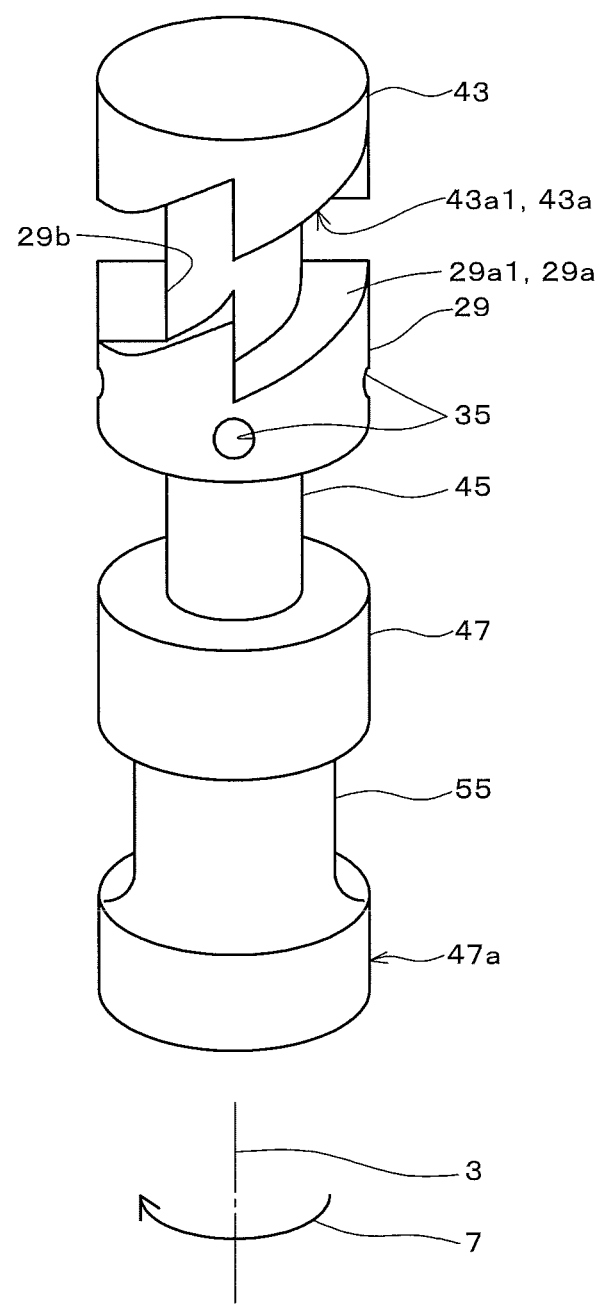
FIG. 3 is a perspective view of a drive gear and a reciprocating shaft according to the embodiment.

As shown in FIG. 3, the drive gear 29 includes a saw blade shaped first tooth 29a, and a through hole 29b. The first tooth 29a has a first sliding surface 29a1. The first sliding surface 29a1 extends helically along the circumference so as to advance toward the distal end direction as it moves in the rotation direction 7. The height 65 of the first tooth 29a is larger than the moving length 63. The through hole 29b extends along the rotation axis 3.

Four third ball holding holes 35 are disposed in the drive gear 29. The third ball holding hole 35 is hemispherical. The third ball holding holes 35 are evenly arranged on the circumference.

As shown in FIG. 1, the four fourth ball holding holes 31 are evenly arranged in the circumferential direction. For example, the fourth ball holding hole 31 are arranged on the basal end side than the first roller groove 25. The fourth ball holding hole 31 is a through hole extending in the radial direction.

The third ball 33 is disposed between the fourth ball holding hole 31, the third ball holding hole 35, and the inner surface 13a. The third ball 33 supports the drive gear 29 in the sleeve 17. The third ball 33 transmits the rotation of the sleeve 17 to the drive gear 29.

The driven gear 43 includes a second tooth 43a. The second tooth 43a has a second sliding surface 43a1. The second tooth 43a meshes with the first tooth 29a. The second sliding surface 43a1 slides with the first sliding surface 29a1.

The stem 45 is a right cylinder and penetrates through the through hole 29b. The stem 45 fixes the driven gear 43 and the tool holder 47. A gap may be provided between the stem 45 and the through hole 29b. The stem 45 may slide with respect to the through hole 29b.

The stem 45 may have a T-shaped or L-shaped communication hole (not shown). The communication hole connects the space above the driven gear 43 and the space below the drive gear 29. The communication hole moves the air in the cylinder 13 when the reciprocating shaft 49 reciprocates.

The tool holder 47 is hollow cylindrical and has an outer cylindrical surface 47a and a shank hole 47b. The tool holder 47 is disposed inside the inner surface 17b of the sleeve 17.

The outer cylindrical surface 47a is a right cylinder, and slides with the inner surface 17b of the sleeve 17.

The shank hole 47b is located at the distal end portion of the tool holder 47 along the rotation axis 3. The rotation cutting tool (tip tool) 61 is mounted to the shank hole 47b. The rotation cutting tool 61 includes a cutting edge 61a at the distal end. A collet (not shown) may be disposed in the shank hole 47b. The collet fastens the rotation cutting tool 61 to the tool holder 47.

The three second ball holding holes 59 are located at the distal end of the sleeve 17. The second ball holding holes 59 are evenly arranged on the circumference. The second ball holding hole 59 is, for example, a through hole extending in the radial direction.

The second roller groove 55, which is a circumferential groove, is arranged on the outer cylindrical surface 47a. The second roller groove 55 has substantially the same length as the moving length 63 in the axial direction. The second roller groove 55 may be longer than the moving length 63.

The three second balls 57 are inserted between the inner surface 13a of the cylinder 13, the second ball holding hole 59, and the second roller groove 55, and roll inside the second roller groove 55. The three second balls 57, which are arranged evenly on the circumference, are supported by the cylinder 13 to hold the tool holder 47 in the center position of the cylinder 13.

The second spring 53 is, for example, a compression coil spring. The second spring 53 is mounted between the tool holder 47 and the drive gear 29. The second spring 53 has a greater elastic force than the first spring 21. The second spring 53 pushes the reciprocating shaft 49 toward the distal end with respect to the drive gear 29. The pushing force with which the second spring 53 pushes the reciprocating shaft 49 acts as a frictional force between the second sliding surface 43a1 and the first sliding surface 29a1, thus torque is transmitted from the drive gear 29 to the driven gear 43.

Next, the operation of the deburring tool 10 will be described.

Figure 4:
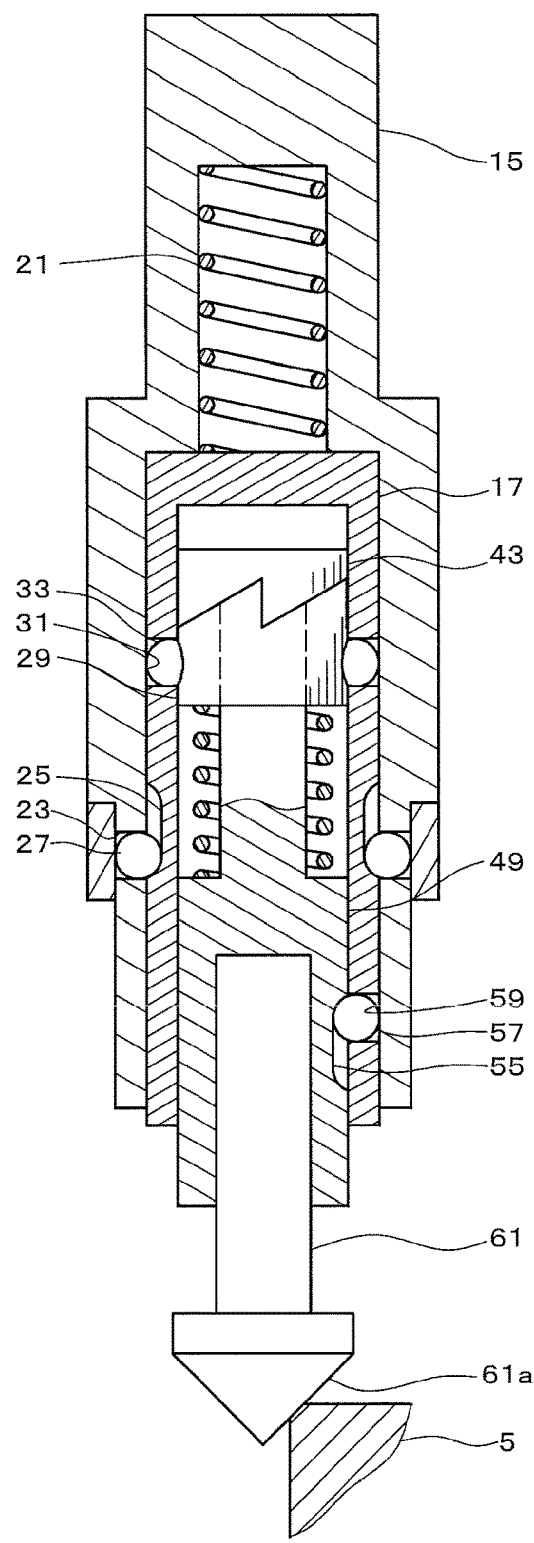
FIG. 4 is a longitudinal cross-sectional view showing the tool in use according to the embodiment.

The deburring tool 10 rotates with the spindle of the machining tool. The rotation is transmitted to the rotation cutting tool 61 via the first ball 27, the sleeve 17, the drive gear 29, and the driven gear 43. When the cutting edge 61a receives an axial thrust force in contact with the workpiece 5, as shown in FIG. 4, the sleeve 17 moves against the elastic force of the first spring 21 to the basal direction. Since the outer peripheral surface 17a of the sleeve 17 slides on the inner surface 13a of the cylinder 13, the sleeve 17 moves accurately. Since the first ball 27 rolls in the first roller groove 25, the sleeve 17 moves along the direction of the rotation axis 3 without rotation.

Figure 5:
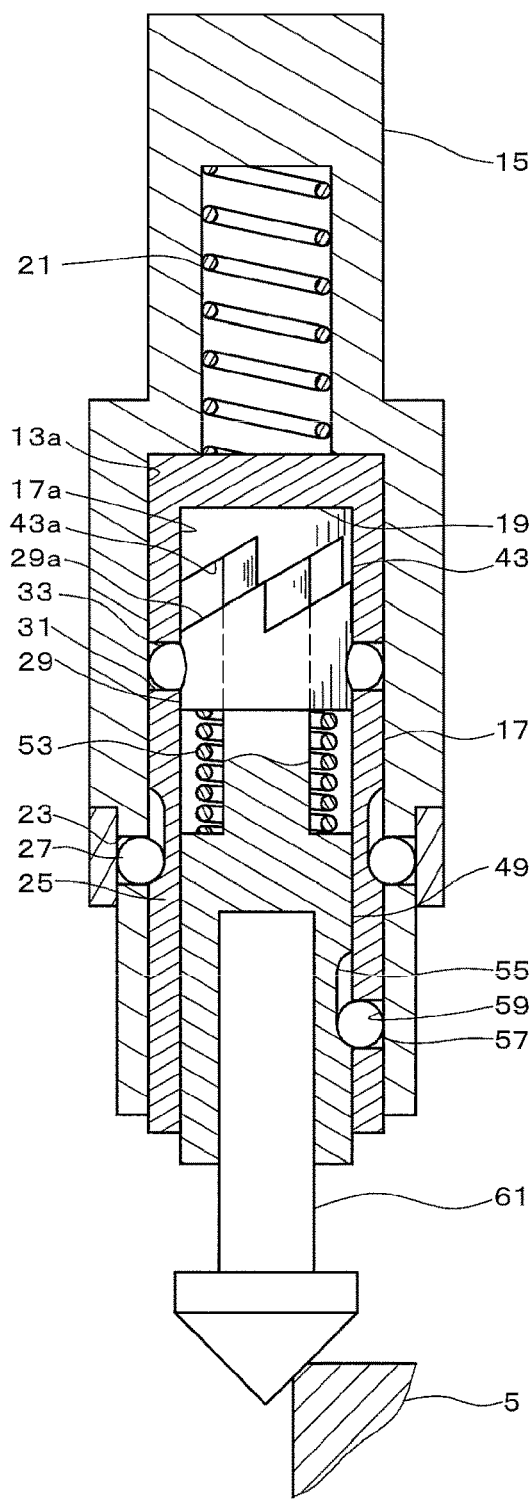
FIG. 5 is a longitudinal cross-sectional view showing the tool in use according to the embodiment.

When the rotation cutting tool 61 receives the cutting torque, as shown in FIG. 5, the second sliding surface 43a1 of the driven gear 43 slides relative to the first sliding surface 29a1 of the drive gear 29 against the frictional force generated between the second sliding surface 43a1 and the first sliding surface 29a1 by the elastic force of the second spring 53. Then, the reciprocating shaft 49 moves in the basal direction while rotating in the reverse direction of the rotation direction 7.

Even if the position of the workpiece 5 varies, the reciprocating shaft 49 is advanced and retracted such that the cutting torque becomes constant with respect to the workpiece 5 in accordance with the thrust load and the radial load received from the workpiece 5, thus the cutting amount by the cutting edge 61a is adjusted. As a result, regardless of the position of the deburring target surface of the workpiece 5, a constant cutting amount is maintained.

Further, by mounting the ceramic brush, which is a tip tool, to deburring tool 10, when contacting the ceramic brush to the workpiece 5 from the lateral direction, the tool holder 47 is raised in accordance with the torque. Therefore, it is possible to suppress damage to the ceramic brush and deburring tool 10.

Further, when deburring by using the deburring tool 10 according to the present embodiment, the machined surface after deburring became smooth.

It should be noted that the present invention is not limited to the embodiments described above, and various modifications can be made without departing from the gist of the present invention, and all technical matters included in the technical idea described in the claims are the study matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

5 Workpiece
10 Deburring tools
11 Shank
13 Cylinder
15 Case
17 Sleeve

21 First spring
29 Drive gear
43 Driven gear
45 Stem
47 Tool holder
49 Reciprocating shaft
53 Second spring

What is claimed is:

1. A deburring tool, comprising:
a case including a shank and a cylinder;
a hollow sleeve configured to reciprocate inside the cylinder in a non-rotating manner;
a drive gear disposed inside the sleeve, the drive gear including a saw blade shaped first tooth at a basal end portion, the drive gear configured to rotate together with the case and the sleeve;
a reciprocating shaft to which a tip tool is mountable, the reciprocating shaft disposed inside the sleeve, the reciprocating shaft including
a driven gear disposed at a basal end portion of the sleeve and a basal end side of the drive gear, the driven gear including a second tooth at a distal end, the second tooth meshing with the first tooth,
a tool holder disposed at a distal end portion of the sleeve, the tool holder configured to slide inside the sleeve in a rotational direction and in a reciprocating direction, and
a stem configured to fix the driven gear and the tool holder, the stem penetrating the drive gear,
a first spring configured to urge the sleeve toward distal end direction; and
a second spring configured to urge the tool holder from the drive gear toward distal end direction.

2. The deburring tool according to claim 1, wherein
the cylinder has a spring housing hole at basal end side, and
the first spring is inserted into the spring housing hole.

3. The deburring tool according to claim 2, wherein
the second spring is arranged inside the sleeve between the drive gear and the tool holder.

4. The deburring tool according to claim 2, wherein
the first tooth has a first sliding surface located toward a distal end direction as the first sliding surface moves in a rotation direction of the shank.

5. The deburring tool according to claim 2, wherein
the sleeve includes a stopper for suppressing a moving length of the drive gear toward basal end, and
the moving length is smaller than a height of a blade of the drive gear.

6. The deburring tool according to claim 2, wherein
the cylinder has a first ball holding hole on an inner surface, and
the sleeve has a first roller groove extending in the reciprocating direction on an outer peripheral surface of the sleeve, and
the deburring tool further comprising:
a first ball disposed in the first ball holding hole to roll in the first roller groove.

7. The deburring tool according to claim 1, wherein
the second spring is arranged inside the sleeve between the drive gear and the tool holder.

8. The deburring tool according to claim 7, wherein
the first tooth has a first sliding surface located toward a distal end direction as the first sliding surface moves in a rotation direction of the shank.

9. The deburring tool according to claim 7, wherein
the sleeve includes a stopper for suppressing a moving length of the drive gear toward basal end, and
the moving length is smaller than a height of a blade of the drive gear.

10. The deburring tool according to claim 7, wherein
the cylinder has a first ball holding hole on an inner surface, and
the sleeve has a first roller groove extending in the reciprocating direction on an outer peripheral surface of the sleeve, and
the deburring tool further comprising:
a first ball disposed in the first ball holding hole to roll in the first roller groove.

11. The deburring tool according to claim 1, wherein
the first tooth has a first sliding surface located toward a distal end direction as the first sliding surface moves in a rotation direction of the shank.

12. The deburring tool according to claim 11, wherein
the sleeve includes a stopper for suppressing a moving length of the drive gear toward basal end, and
the moving length is smaller than a height of a blade of the drive gear.

13. The deburring tool according to claim 11, wherein
the cylinder has a first ball holding hole on an inner surface, and
the sleeve has a first roller groove extending in the reciprocating direction on an outer peripheral surface of the sleeve, and
the deburring tool further comprising:
a first ball disposed in the first ball holding hole to roll in the first roller groove.

14. The deburring tool according to claim 1, wherein
the sleeve includes a stopper for suppressing a moving length of the drive gear toward basal end, and
the moving length is smaller than a height of a blade of the drive gear.

15. The deburring tool according to claim 14, wherein
the cylinder has a first ball holding hole on an inner surface, and
the sleeve has a first roller groove extending in the reciprocating direction on an outer peripheral surface of the sleeve, and
the deburring tool further comprising:
a first ball disposed in the first ball holding hole to roll in the first roller groove.

16. The deburring tool according to claim 1, wherein
the cylinder has a first ball holding hole on an inner surface, and
the sleeve has a first roller groove extending in the reciprocating direction on an outer peripheral surface of the sleeve, and
the deburring tool further comprising:
a first ball disposed in the first ball holding hole to roll in the first roller groove.

17. The deburring tool according to claim 1, wherein
the sleeve has a second ball holding hole on an inner surface,
the tool holder has a second roller groove on an outer peripheral surface of the tool holder,
the deburring tool further comprising:
a second ball disposed in the second ball holding hole to roll in the second roller groove.

18. The deburring tool according to claim 1, wherein the second spring has an elastic force greater than the first spring.

\* \* \* \* \*